United States Patent
Kamei et al.

[11] Patent Number: 6,028,473
[45] Date of Patent: *Feb. 22, 2000

[54] SERIES CAPACITOR CHARGE PUMP WITH DYNAMIC BIASING

[75] Inventors: Teruhiko Kamei, Yokohama; Kouta Soejima, Kawasaki, both of Japan; I-Long Lee, I-Lan Hsian, Taiwan; Ray-Lin Wan, Milpitas, Calif.

[73] Assignee: Macronix International Co., Ltd., Hsinchu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/619,768
[22] PCT Filed: Mar. 9, 1995
[86] PCT No.: PCT/US95/03069
  § 371 Date: Mar. 19, 1996
  § 102(e) Date: Mar. 19, 1996
[87] PCT Pub. No.: WO96/28850
  PCT Pub. Date: Sep. 19, 1996
[51] Int. Cl.[7] .................................................... H02M 3/18
[52] U.S. Cl. .......................... 327/536; 327/537; 307/110
[58] Field of Search .............................. 307/110; 363/60; 327/534, 535, 536, 537

[56] References Cited

U.S. PATENT DOCUMENTS

| | | | |
|---|---|---|---|
| 4,433,253 | 2/1984 | Zapisek | 327/536 |
| 4,797,899 | 1/1989 | Fuller et al. | 307/110 |
| 4,807,104 | 2/1989 | Floyd et al. | 363/59 |
| 5,008,799 | 4/1991 | Montalvo | 363/60 |
| 5,059,815 | 10/1991 | Bill et al. | 327/537 |
| 5,132,895 | 7/1992 | Kase | 363/60 |
| 5,422,586 | 6/1995 | Tedrow et al. | 327/306 |

*Primary Examiner*—Terry D. Cunningham
*Attorney, Agent, or Firm*—Haynes & Beffel LLP

[57] ABSTRACT

A charge pump apparatus which comprises first and second active capacitors in series, having a common node between them. The second node of the second active capacitor is coupled to a particular node in the charge pump which drives an output of the charge pump. A pump clock is connect to the first lead of the first active capacitor. A voltage clamp is connected to the particular node and provides a bias point. A dynamic biasing circuit is connected to the common node and charges the common node and the particular node during intervals between transitions of the pump clock to keep both the first and second active capacitors activated during the transitions of the pump clock. In a first embodiment, the first and second active capacitors comprise n-channel MOS devices, or equivalents, and the dynamic biasing circuit includes the precharge circuit responsive to a charge clock to pull up the common node during intervals in which the pump clock is low, and wherein the charge clock has transitions which are non-overlapping with transitions of the pump clock. Where the first and second active capacitors comprise p-channel MOS devices, or equivalents, the dynamic biasing circuit includes a precharge circuit responsive to a charge clock to pull down the common node during intervals in which the pump clock is high, and wherein the charge pump has transitions which are non-overlapping with transitions with the pump clock.

20 Claims, 4 Drawing Sheets

SERIES CAPACITOR CHARGE PUMP WITH DYNAMIC BIASING

BACKGROUND OF INVENTION

1. Field of the Invention

The present invention relates to the design of integrated circuit charge pumps, used to generate high positive or negative potentials, such as charge pumps utilized in integrated circuit flash EEPROM devices to establish program and erase potentials for the array.

2. Description of Related Art

In many integrated circuits, it is desirable to produce a potential higher than the standard supply voltage, or a voltage having a polarity opposite to the supply voltage. These potentials can be generated using charge pump circuitry implemented on the integrated circuit.

One application for charge pump circuitry is in the generation of program and erase potentials for flash EEPROM devices. Flash EEPROM devices need potentials on the order of 12–15 volts in order to program or erase the memory cells. Some devices resort to the use of a high programming potential supply external to the chip to provide these voltages. However, recent designs have migrated towards the use of standard 5 volt supplies only, relying on charge pumps to generate to programming and erasing potentials. These potentials may also be achieved by producing both negative and positive voltages using charge pumps, to avoid generating a high absolute value potential on chip.

One problem associated with charge pump circuitry is the requirement of capacitors on chip. One cost effective type of capacitor on integrated circuits, such as flash EEPROM, is based on connecting the source and drain of an MOS device together to provide one terminal of the capacitor, and using the gate of the device as the second terminal of the capacitor. These MOS capacitors are examples of "active" capacitors, which require a threshold voltage across the device to activate. Thus, the circuitry using these active capacitors must be properly biased during operation of the charge pump to ensure proper operation.

Another problem associated with charge pumps on integrated circuits is the high voltage produced. These high voltages can exceed the breakdown potentials of the active devices used to produce the capacitors. Thus, charge pumps have been developed using series capacitors. The voltage dividing action of series capacitors reduces the potential across any one of the capacitors in series. This allows the charge pumps to achieve higher voltages without reaching the breakdown threshold of the capacitors.

For instance, U.S. Pat. No. 5,008,799 invented by Montalvo, and U.S. Pat. No. 5,059,815 invented by Bill el al., describe charge pumps using series capacitors. The Bill et al. and Montalvo patents provide a discussion of the background to the present invention, and are incorporated by reference for such purpose.

In the Bill et al. patent, the series capacitors consist of a single active device in series with an active parallel plate capacitor. The active device in the series is biased to an active state by a pull up circuit. The parallel plate capacitor needs no biasing. However, parallel plate capacitors may provide undesirable design constraints in the implementation of the charge pumps on integrated circuits.

The Montalvo patent avoids the use of parallel plate capacitors on chip by using series active capacitors. In Montalvo, the second active capacitor (the output device) in the series is implemented using two "back-to-back" devices, for a total of three active capacitors in a single charge pump stage. The series active capacitor design presents a difficult biasing problem of maintaining a sufficient voltage at the common node between the capacitors to activate the input device while maintaining a sufficient voltage on the output node to activate the output device, in order to ensure that both capacitors remain activated during the charge pumping operation. Using the back-to-back capacitors ensures that at least one of the back-to-back capacitors is activated, except for brief transitions when the difference across the back-to-back capacitors is less than the threshold of either. During this transition, the pump capacitance is very small and the voltage dividing effect of the series capacitors is weakened.

It is desirable to provided a series capacitor charge pump which overcomes the problems of the prior art devices, and is suitable for use in integrated circuits.

SUMMARY OF THE INVENTION

The present invention provides a charge pump apparatus using series capacitors. A dynamic biasing circuit is connected to a common node between the capacitors, which charges the common node during intervals between transitions of the pump clock to keep the active capacitors activated during the transitions of the pump clock. Use of the dynamic biasing circuit according the present invention eliminates the need for "back-to-back" active capacitors as taught by Montalvo. Also, the advantage of the voltage dividing effect of series capacitors may be achieved with dynamic precharge using active devices exclusively.

Thus, the present invention can be characterized as a charge pump apparatus which comprises first and second active capacitors in series, having a common node between them. The second node of the second active capacitor is coupled to a particular node in the charge pump which drives an output of the charge pump. A pump clock is connect to the first lead of the first active capacitor. A voltage clamp is connected to the particular node and provides a bias point. A dynamic biasing circuit is connected to the common node and charges the common node and the particular node during intervals between transitions of the pump clock to keep both the first and second active capacitors activated during the transitions of the pump clock.

In a first embodiment, the first and second active capacitors comprise n-channel MOS devices, or equivalents, and the dynamic biasing circuit includes the precharge circuit responsive to a charge clock to pull up the common node during intervals in which the pump clock is low, and wherein the charge clock has transitions which are non-overlapping with transitions of the pump clock.

Where the first and second active capacitors comprise p-channel MOS devices, or equivalents, the dynamic biasing circuit includes a precharge circuit responsive to a charge clock to pull down the common node during intervals in which the pump clock is high, and wherein the charge pump has transitions which are non-overlapping with transitions with the pump clock.

According to another embodiment of the present invention, a charge pump having a plurality of stages is included. At least one of the stages utilizes a series capacitor structure described above. In this embodiment, there is a diode circuit such as an MOS device having its gate and drain connected together coupled to the particular node on the second lead of the second active capacitor, which transfers the peak voltages attained at that particular node to the next stage of the device, or for the final stage, to the output of the charge pump.

Accordingly, the present invention provides a charge pump which consists solely of MOS devices, and is capable of achieving high charge pump voltages on a single integrated circuit. Other advantages and features of the present invention can be seen upon a review of the figures, the detailed description, and the claims which follow.

DETAILED DESCRIPTION

A detailed description of preferred embodiments of the present invention is provided with respect to the figures.

Figure 1:
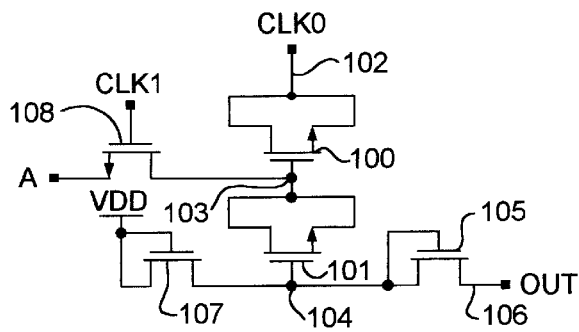
FIG. 1 is a schematic diagram of a series capacitor charge pump according to the present invention.

FIG. 1 shows the basic implementation of the series capacitor charge pump according to the present invention. The charge pump includes a first MOS device 100 in series with a second MOS device 101. The source and drain of the first MOS device 100 are coupled to a clock input 102 which receives the signal CLK0. The gate of the MOS device 100 is coupled to a common node 103. The source and drain of the MOS device 101 are coupled to the common node 103. The gate of the MOS device 101 is coupled to a particular node 104 in the charge pump, which drives the output. The particular node 104 is connected to the gate and drain of a diode connected MOS device 105. The source of the device 105 is connected to the output on line 106 of the charge pump.

The MOS devices 100 and 101 are activated by threshold voltages across the respective devices. For n-channel devices as illustrated in FIG. 1, the threshold is a positive value from gate to source in the range of 1 volt. For proper operation of the charge pump, both devices 100 and 101 must be activated during transitions of the charge pump clock CLK0. When the gate to source voltage of the capacitor connected MOS device 100 and capacitor connected MOS device 101 are less than the threshold voltage, then the effective capacitance of the devices is very low. When the devices are activated by increasing the gate to source voltage to a level above the threshold voltage, then the capacitance of the devices increases to an activated state. In the activated state, the capacitance is substantially higher than in the off state.

Node 104 is biased by the clamp circuit consisting of diode connected MOS device 107. The gate and drain of MOS device 107 are connected to the supply voltage VDD. The source of the MOS device 107 is coupled to the particular node 104.

The common node 103 is biased by a dynamic biasing circuit which charges the common node 103 and the particular node 104 during intervals between transitions of the pump clock CLK0 to keep both the first and second MOS devices 100 and 101 activated during transitions of the pump clock CLK0. Thus, the dynamic precharge circuit of FIG. 1 is represented by the pass gate consisting of MOS device 108. The MOS device 108 has its source connected to receive the signal A, its drain connected to the common node 103, and its gate connected to a charge clock CLK1.

Figure 2:
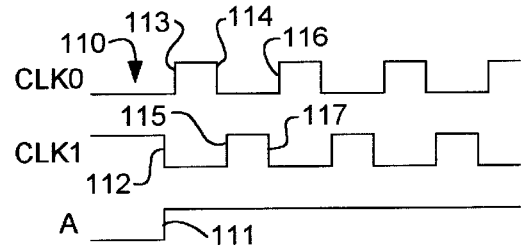
FIG. 2 is a timing diagram for the signals in the charge pump of FIG. 1.

The pump clock, CLK0, the charge clock, CLK1, and the signal A are illustrated in FIG. 2. Before the pump clock CLK0 is turned on, as is represented by interval 110, the pump clock is low, the charge clock is high, and the signal A is low. This results in pulling node 103 down to the low value of A, such as ground. During this interval 110, the clamp circuit 107 establishes a bias point at the particular node 104 of about 4 volts. This activates the active capacitor 101. However, capacitor 100 is not activated. Thus, to activate the MOS device 100, the signal A is switched to high at point 111. The signal CLK1 transitions from high to low at point 112. In this state, pass gate 108 is turned off preventing pulling up of the common node 103. The pump clock CLK0 will transition at point 113 from low to high, while the charge clock CLK1 remains low. At point 114, the pump clock CLK0 transitions from high to low. As can be seen, the charge clock CLK1 remains low during this transition at point 114. After the transition at point 114, the charge clock CLK1 will transition from low to high at point 115. This turns on the pass gate 108, and, because the signal A remains high, begins to charge the common node 103. Because the capacitor 101 is activated, particular node 104 will also rise with common node 103. Before the next transition at point 116 in the pump clock CLK0, the charge clock CLK1 will transition from high to low at point 117. This turns off the pass gate 108 during the transitions of the pump clock. Thus, if common node 103 has not reached a potential high enough to activate the MOS device 100, then the dynamic biasing circuit is turned off and will not continue to pull up common node 103. Thus, MOS device 100 will not first activate before a high to low transition of the pump clock CLK0. If MOS device 100 activates before a high to low transition, then the action of the pump clock will drive common node 103 and particular node 104 downward, rather than upward, the proper pumping action for the n-channel charge pump. Also, the downward pumping action might harm the devices used to implement the charge pump. For this reason, it is important that the charge clock CLK1 controls the dynamic biasing circuit to charge common node 103 only while the pump clock CLK0 is low, and that it has transitions that do not overlap with the pump clock.

Figure 3:
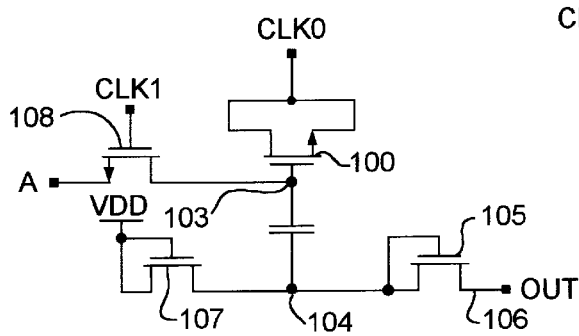
FIG. 3 is a schematic diagram of a series capacitor charge pump using a standard capacitor in series with an MOS device according to the present invention.

FIG. 3 illustrates an alternative implementation of the charge pump according to the present invention. The components of FIG. 1, which are in common, have the same reference numbers. It can be seen that the circuit in FIG. 3 differs only by the use of a parallel plate capacitor 120 in place of the second active capacitor 101 of FIG. 1. The timing diagram of FIG. 2 also applies to FIG. 3. FIG. 3 operates just as FIG. 1.

Figure 4:
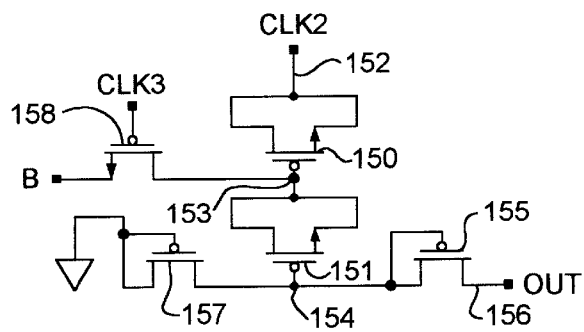
FIG. 4 is schematic diagram of a series capacitor charge pump using p-channel MOS devices according to the present invention.

FIG. 4 illustrates a series capacitor charge pump according to the present invention implemented using p-channel devices rather than n-channel devices. The charge pump of FIG. 4 operates to produce a negative voltage on its output. Thus, the charge pump of FIG. 4 includes a first active capacitor 150 in series with a second active capacitor 151. The source and drain of the active capacitor 150 are connected to a pump clock CLKA on line 152. The gate of the device 150 is connected to a common node 153. The source and drain of the device 151 are connected to the common node 153. The gate of the device 151 is connected to particular node 154 which drives the output of the device. Node 154 is connected to the gate and source of diode connected transistor 155. The drain of the transistor 155 is connected to the output on line 156.

The particular node 154 is biased by diode connected transistor 157 which has its gate and source connected to ground, and its drain connected to the particular node 154. The dynamic precharge circuit is coupled to the common node 153. The circuit is represented by the pass gate transistor 158 which has its drain connected to the common node 153, its source connected to the control signal B, and its gate connected to the charge clock CLK3.

Figure 5:
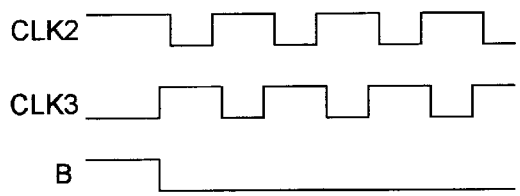
FIG. 5 is a timing diagram for the signals used in the charge pump of FIG. 4.

FIG. 5 provides a timing diagram for the signals CLK2, CLK3, and B for the charge pump of FIG. 4. As can be seen, these signals are similar to those of FIG. 2, except having opposite polarity. The dynamic precharge circuit operates to initialize common node 153 at a high state, and pull common node 153 down during intervals in which the pump clock CLK2 is high. The transitions of the charge clock CLK3 are non-overlapping with the transitions of the pump clock CLK2.

Figure 6:
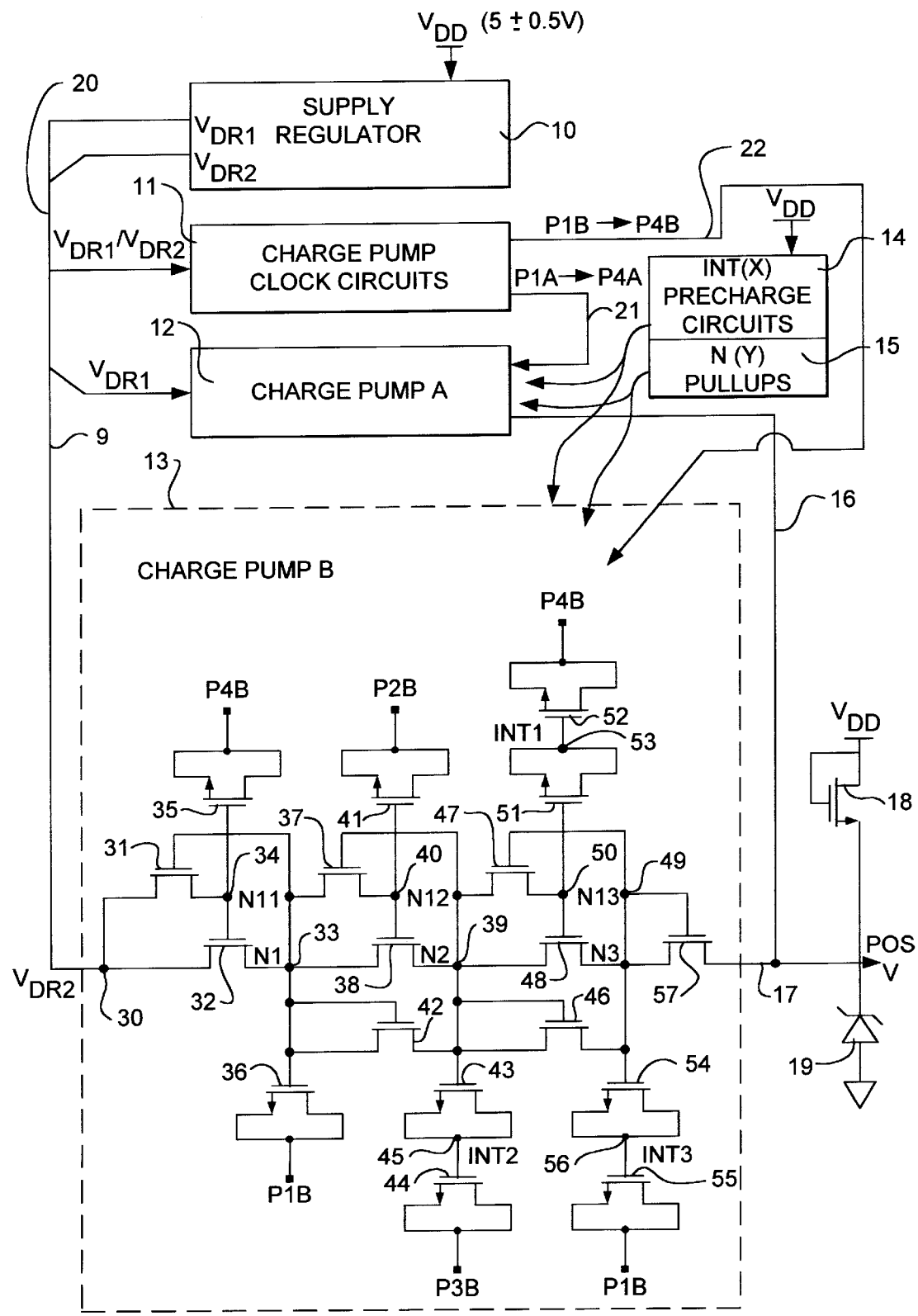
FIG. 6 is a schematic diagram of a charge pump circuit on an integrated circuit implemented according to the present invention.

FIG. 6 illustrates the basic positive voltage generator with a supply regulator for use in a flash EEPROM integrated circuit according to the present invention. This voltage generator includes a supply regulator 10 which is coupled to the 5 volt power supply $V_{DD}$. The 5 volt power supply is specified to vary over a range of 5±/−0.5 volts. The circuit also includes charge pump clock driver circuits 11, a first multiple stage charge pump 12, labelled charge pump A, and a second multiple stage charge pump, labelled charge pump B. Charge pump B is illustrated at the transistor level for purposes of description of one example of the present invention. It will be recognized that charge pump A should have the same or similar design. Also shown in the figure are the internal precharge circuits 14 and internal pull up (or clamp) circuits 15 which are connected to labelled nodes on the charge pumps, as can be seen with reference to charge pump B. The positive program voltages on the outputs of the charge pumps are supplied on lines 16 and 17, respectively, and coupled to the voltage output driver, which is composed of transistor 18 and diode 19.

The supply regulator 10 generates regulated supply voltages $V_{DR1}$ and $V_{DR2}$. These regulated supply voltages are supplied on line 20 to the charge pump clock circuits 11, charge pump A, and charge pump B. Charge pump A is driven by supply voltage $V_{DR1}$, while charge pump B is driven by supply voltage $V_{DR2}$.

The charge pump clock circuits 11 generate the charge pump clocks labelled P1A through P4A on line 21 and P1B through P4B on line 22. The clock signals P1B through P4B are connected as illustrated in charge pump B.

The output diode 19 is formed by coupling an n-type buried diffusion region to line 17, the n-type buried diffusion region formed in a p-well. The p-well is grounded. The junction between the n-type buried diffusion region and the p-well forms the output diode 19, having a breakdown voltage of approximately 7 volts. The output transistor 18, in this example, has a width of 200 microns and a length of 1.2 microns.

Charge pump B receives as a reference supply input on line 9 the regulated supply voltage $V_{DR2}$ at node 30. Node 30 is coupled to the source of transistor 31 and to the source of transistor 32. The gate of transistor 31 is coupled to node 33. The drain of transistor 31 is coupled to node 34. The gate of transistor 32 is coupled to node 34 and the drain of transistor 32 is coupled to node 33. An MOS capacitor formed of transistor 35 has its gate coupled to node 34 and its source and drain coupled to the clock input P4B. An MOS capacitor formed by transistor 36 has its gate coupled to node 33 and its source and drain coupled to the clock input P1B.

The sources of transistors 37 and 38 are connected to node 33. The gate of transistor 37 and the drain of transistor 38 are coupled to node 39. The gate of transistor 38 and the drain of transistor 37 are coupled to node 40. The MOS capacitor formed by transistor 41 has its gate connected to node 40 and its source and drain coupled to the clock input P2B. Also, node 33 is coupled to the gate and source of transistor 42. The drain of transistor 42 is connected to node 39. Node 39 is also connected to the series MOS capacitors made up by transistors 43 and 44. Transistor 43 has its gate connected to node 39 and its source and drain connected to node 45. Transistor 44 has its gate coupled to node 45 and its source and drain connected to the clock input P3B.

Also, node 39 is connected to the gate and source of transistor 46 and to the sources of transistors 47 and 48. The gate of transistor 47 and the drain of transistor 48 are coupled to node 49. The gate of transistor 48 and the drain of transistor 47 are coupled to node 50. Also, the drain of transistor 46 is coupled to node 49. Node 50 is connected to series MOS capacitors made up by transistors 51 and 52. The gate of transistor 51 is connected to node 50. The source and drain of transistor 51 are connected to node 53. The gate of transistor 52 is connected to node 53. The source and drain of transistor 52 are connected to the clock input P4B. Node 49 is connected to the series MOS capacitors formed by transistors 54 and 55. Transistor 54 has its gate connected to node 49 and its source and drain connected to node 56. Transistor 55 has its gate connected to node 56 and its source and drain connected to the clock input P1B.

Node 49 is also connected to the gate and source of transistor 57. The drain of transistor 57 drives line 17 with the output of the charge pump B.

In this example, transistors 35, 41, 51, and 52 are native n-channel devices which have a width of 50 microns and a length of 15 microns. Transistors 31, 37, and 47 are native n-channel devices with a width of 20 microns and a length of 1.2 microns. Transistors 32, 38, 48, 42, and 46 are native n-channel devices with a width of 100 microns and a length of 1.2 microns. Transistors 36, 43, 54, 44, and 55 are native n-channel devices with a width of 300 microns and a length of 100 microns. The output transistor 57 is a native n-channel device with a width of 200 microns and a length of 1.2 microns. A "native" n-channel device does not have enhancement doping in the channel region, which is used to increase the p-type doping over the substrate levels in "normal" n-channel devices.

As mentioned above, there are pull up circuits in charge pump B, and similar pull up circuits in charge pump A, which are connected to the nodes 34, 33, 39, 40, 49, and 50. The nodes at which pull ups are connected are labelled N1, N11, N2, N12, N3, and N13 in FIG. 6. Each of them consists of a clamping transistor having its gate and drain coupled to the supply voltage $V_{DD}$ and its source connected to the node being pulled up. The size of these transistors in this example is 4 microns in width and 1.2 microns in length.

Also, precharge circuits are connected between the series MOS capacitors at nodes 53, 45 and 56, labelled INT1, INT2, and INT3. The precharge circuits can take the structure shown in FIG. 7 or FIG. 9.

Figure 7:
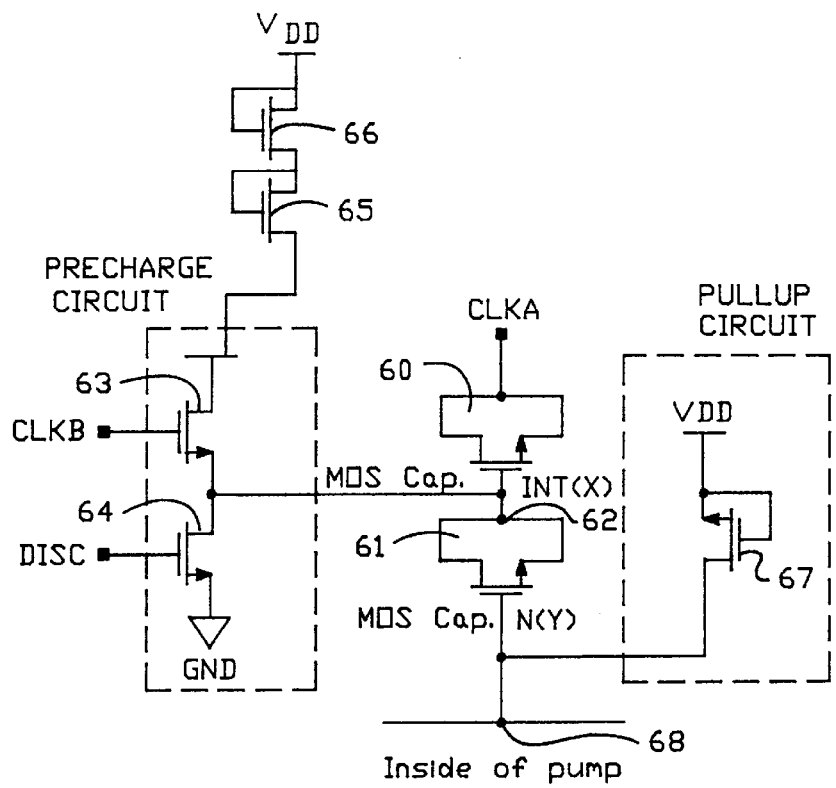
FIG. 7 is a schematic diagram of one stage of the charge pump of FIG. 6 showing the precharge circuit and pull up circuits according to the present invention.

As shown in FIG. 7, two MOS capacitors in series are shown, including MOS capacitor 60 and MOS capacitor 61. These capacitors may correspond, for example, to the capacitors formed by transistors 54 and 55 in FIG. 6. A precharge circuit is coupled to the node 62 as shown. The precharge circuit includes a first transistor 63 in series with a second transistor 64. The first transistor has its drain connected to the supply voltage through diode connected transistors 65 and 66. The source of transistor 63 is connected to node 62 and to the drain of transistor 64. Node 62 may correspond to node 56 (INT3) of FIG. 6. The source of transistor 64 is connected to ground. The gate of transistor 63 is connected to the signal labelled CLKB, which is a clock signal. The gate of transistor 64 is connected to a discharge signal labelled DISC.

Pull up transistor 67 is connected to the gate of the MOS capacitor 61. Thus, the gate of MOS capacitor 61 is connected to node 68 which has pull up circuit based on transistor 67 connected thereto. Node 68 may correspond to node 49 (N3) in FIG. 6.

Figure 8:
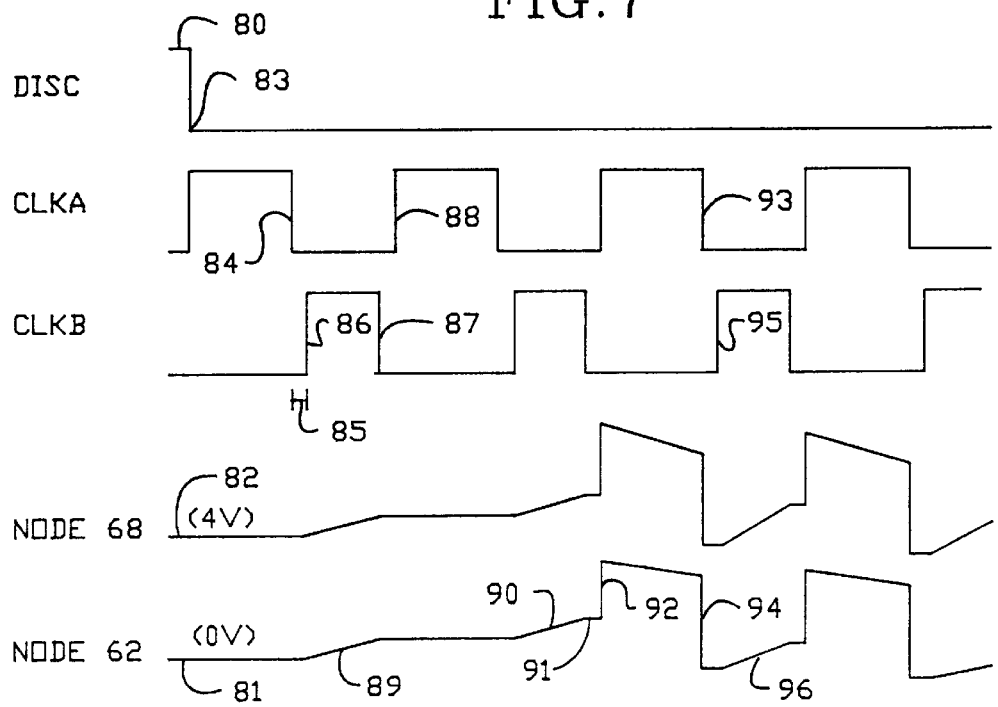
FIG. 8 is a timing diagram used for explaining the operation of the precharge circuit according to the present invention.

With reference to FIG. 8, the operation of the precharge circuit is described.

In particular, the signal DISC is initially high, as indicated at 80. When the DISC is high, transistor 64 keeps the node 62 grounded, nominally near zero volts, as shown at 81. The pull up circuit 67 keeps node 68 from dropping below a bias point of approximately 4 volts, as illustrated at 82. When the circuit is enabled, the DISC signal drops low at point 83. The clock signal CLKA, which is coupled to the MOS capacitor 60 of FIG. 7, begins clocking the series capacitors, as illustrated. When node 62 is low, the MOS capacitor 60 is turned off. Thus, the first falling edge of CLKA at 84 has substantially no effect on node 62 or node 68. After CLKA falls at point 84, and a short interval indicated at 85, CLKB rises at 86. Similarly, CLKB falls at 87, a short time before CLKA rises at 88. When CLKB rises and CLKA is low, node 81 will begin to charge up through transistor 63 as indicated at 89. Also, node 68 will follow node 62, because capacitor 61 is always on. When CLKB falls and CLKA is high, during the second cycle, node 62 is still not high enough to turn on capacitor 60. Thus, there is no pumping action. During the next cycle of CLKB, node 62 increases further, as indicated at 90, with node 68 following. It reaches a level at 91 which is high enough to turn on MOS capacitor 60. At this point, when CLKA rises, the pumping action occurs, driving node 62 up as CLKA goes up, as indicated at 92. When CLKA falls at 93, node 62 drops, as indicated at 94. When CLKB rises, as indicated at 95, node 62 will charge up, as indicated at 96, maintaining a level sufficient to keep the MOS capacitor 60 on during pump operation.

This action also maintains a difference between node 62 and node 68 high enough to keep MOS capacitor 61 activated during transitions of the pump clock CLKA.

Figure 9:
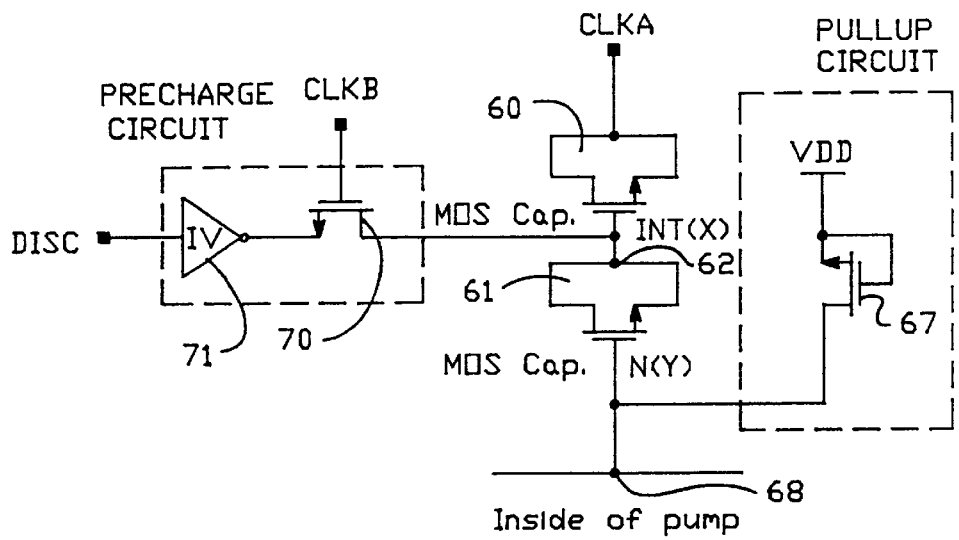
FIG. 9 is a schematic diagram of a stage of the charge pump showing an alternative embodiment of the precharge circuit according to the present invention.

FIG. 9 illustrates an alternative precharge circuit for the charge pump of FIG. 6. FIG. 9 has components similar to those in FIG. 7 and uses like reference numbers for like components. It differs in that the precharge circuit is made up of transistor 70 and inverter 71. In this embodiment, the transistor has its drain connected to node 62, its gate connected to the signal CLKB, and its source connected to the output of inverter 71. The input of inverter 71 is connected to the DISC signal. This circuit works in a substantially similar way as that in FIG. 7, except that the signal CLKB must be high when the circuit is not working to pull down the node 62.

As mentioned above, the clock signals CLKA and CLKB do not overlap in the embodiments of FIGS. 7 and 9. If they did, the top transistor 60 might turn on in the early cycles after the signal CLKA is high, resulting in a negative pump on the next falling edge of CLKA. This may cause harm to the n-channel devices used as the capacitors in this circuit. Alternatively, if overlapping clocks are used, CLKA must be controlled so that it starts from V,, for a positive pump while common node 62 is high, or vice versa for a negative pump.

Figure 10:
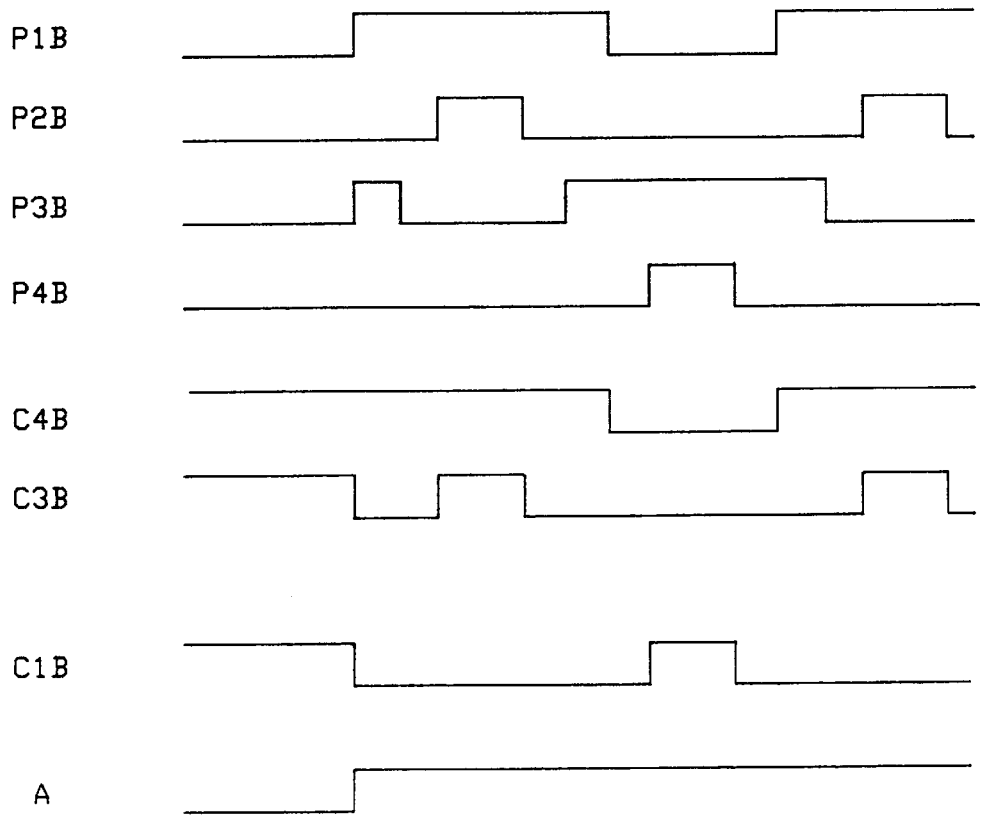
FIG. 10 is a timing diagram illustrating the timing of the pump clock and charge clock signals of the charge pump of FIG. 6.

For completeness, FIG. 10 illustrates the timing diagram of the clock signals used with the charge pump of FIG. 6.

The timing diagram of FIG. 10 includes the signals P1B through P4B which are coupled to the pump clock nodes in the charge pump 13 of FIG. 6. Also, the charge clocks for corresponding series capacitor pump stages are shown. In particular, the charge clock for the node INT1 53 of FIG. 6 is labeled C4B in FIG. 10. The charge clock CB3 in FIG. 10 for the node INT245 is shown. The charge clock C1B for the node INT3 56 is shown in FIG. 10. The signal A in FIG. 10 corresponds to the signal A in FIG. 1, and is essentially the inverse of DISC shown in FIGS. 7 and 9.

It can be seen that the charge clocks C1B, C3B, and C4B are easily generated in the four phase charge pump of FIG. 6, because the charge clock C4B is essentially the same as the pump clock P1B, except for the initial state. Similarly charge clock C3B is similar to pump clock P2B, except for the initial state, and charge clock C1B is similar to pump clock C4B, except for the initial state.

In conclusion, the present invention provides a technique for making integrated circuit charge pump, using series active capacitors based on transistors, such as n-channel or p-channel MOS devices, which is capable of achieving high pump voltages without breaking down the capacitors used in the device. Also, by using only MOS devices to implement the charge pump, the manufacturability of the circuit is greatly increased, reducing the cost of integrated circuits using the charge pump.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A charge pump apparatus, comprising;
   a first active capacitor activated by a threshold voltage, having a first lead and a second lead;
   a second capacitor connected in series with the first active capacitor, having a first lead connected to a common node with the second lead of the first active capacitor and a second lead, the second lead connected to a particular node;
   a pump clock input connected to the first lead of the first active capacitor;

a voltage clamp coupled to the particular node which provides a bias point; and a dynamic biasing circuit connected to the common node which provides charge to the second lead of the first active capacitor at the common node and the particular node between transitions of the pump clock to keep the first active capacitor activated during transitions of the pump clock;

wherein the second capacitor comprises a second active capacitor which requires a higher voltage on its second lead than on the common node by the threshold to activate, and the bias point is more than a sum of the threshold plus a peak voltage reached by the common node during transitions of the pump clock.

2. The charge pump apparatus of claim 1, wherein the first and second active capacitors comprise n-channel MOS devices.

3. A charge pump apparatus comprising;

a first active capacitor activated by a threshold voltage, having a first lead and a second lead;

a second capacitor connected in series with the first active capacitor, having a first lead connected to a common node with the second lead of the first active capacitor and a second lead, the second lead connected to a particular node;

a pump clock input connected to the first lead of the first active capacitor;

a voltage clamp coupled to the particular node which provides a bias point; and a dynamic biasing circuit connected to the common node which provides charge to the second lead of the first active capacitor at the common node and the particular node between transitions of the pump clock to keep the first active capacitor activated during transitions of the pump clock;

wherein the second capacitor comprises a second active capacitor which requires a lower voltage on its second lead than on the common node by the threshold to activate, and the bias point is less than a minimum voltage reached by the common node during transitions of the pump clock, less the threshold.

4. The charge pump apparatus of claim 3, wherein the first and second active capacitors comprise p-channel MOS devices.

5. A charge pump apparatus comprising:

a first active capacitor activated by a threshold voltage, having a first lead and a second lead;

a second capacitor connected in series with the first active capacitor, having a first lead connected to a common node with the second lead of the first active capacitor and a second lead, the second lead connected to a particular node;

a pump clock input connected to the first lead of the first active capacitor;

a voltage clamp coupled to the particular node which provides a bias point; and a dynamic biasing circuit connected to the common node which provides charge to the second lead of the first active capacitor at the common node and the particular node between transitions of the pump clock to keep the first active capacitor activated during transitions of the pump clock;

wherein the first active capacitor comprises an n-channel MOS device, and the dynamic biasing circuit includes:

a precharge circuit responsive to a charge clock to pull up the common node during intervals in which the pump clock is low.

6. The charge pump apparatus of claim 6, wherein the charge clock has transitions which are non-overlapping with transitions of the pump clock.

7. A charge pump apparatus comprising:

a first active capacitor activated by a threshold voltage, having a first lead and a second lead;

a second capacitor connected in series with the first active capacitor, having a first lead connected to a common node with the second lead of the first active capacitor and a second lead, the second lead connected to a particular node;

a pump clock input connected to the first lead of the first active capacitor;

a voltage clamp coupled to the particular node which provides a bias point; and a dynamic biasing circuit connected to the common node which provides charge to the second lead of the first active capacitor at the common node and the particular node between transitions of the pump clock to keep the first active capacitor activated during transitions of the pump clock;

wherein the first active capacitor comprises a p-channel MOS device, and the dynamic biasing circuit includes:

a precharge circuit responsive to a charge clock to pull down the common node during intervals in which the pump clock is high.

8. The charge pump apparatus of claim 7, wherein the charge clock has transitions which are non-overlapping with transitions of the pump clock.

9. A charge pump apparatus including a plurality of pump stages, at least one of the plurality of stages comprising:

a first active capacitor activated by a threshold voltage, having a first lead and a second lead;

a second active capacitor activated by a threshold voltage, and connected in series with the first active capacitor, having a first lead connected to a common node with the second lead of the first active capacitor and a second lead, the second lead connected to a particular node;

a stage pump clock input connected to the first lead of the first active capacitor;

a voltage clamp coupled to the particular node which provides a bias point; and a dynamic biasing circuit connected to the common node which provides charge to the second lead of the first active capacitor and the first lead of the second active capacitor at the common node and particular node between transitions of the stage pump clock to keep both the first and the second active capacitors activated during transitions of the stage pump clock;

wherein the second active capacitor requires a higher voltage on its second lead than on the common node by the threshold to activate, and the bias point is more than a sum of the threshold plus a peak voltage reached by the common node during transitions of the stage pump clock.

10. The charge pump apparatus of claim 9, wherein the first and second active capacitors comprise n-channel MOS devices.

11. A charge pump apparatus including a plurality of pump stages, at least one of the plurality of stages comprising:

a first active capacitor activated by a threshold voltage, having a first lead and a second lead;

a second active capacitor activated by a threshold voltage, and connected in series with the first active capacitor, having a first lead connected to a common node with the second lead of the first active capacitor and a second lead, the second lead connected to a particular node;

a stage pump clock input connected to the first lead of the first active capacitor;

a voltage clamp coupled to the particular node which provides a bias point; and a dynamic biasing circuit connected to the common node which provides charge to the second lead of the first active capacitor and the first lead of the second active capacitor at the common node and the particular node between transitions of the stage pump clock to keep both the first and the second active capacitors activated during transitions of the stage pump clock;

wherein the second active capacitor requires a lower voltage on its second lead than on the common node by the threshold to activate, and the bias point is less than a minimum voltage reached by the common node during transitions of the stage pump clock, less the threshold.

12. The charge pump apparatus of claim 11, wherein the first and second active capacitors comprise p-channel MOS devices.

13. A charge pump apparatus including a plurality of pump stages, at least one of the plurality of stages comprising:

a first active capacitor activated by a threshold voltage, having a first lead and a second lead;

a second active capacitor activated by a threshold voltage, and connected in series with the first active capacitor, having a first lead connected to a common node with the second lead of the first active capacitor and a second lead, the second lead connected to a particular node;

a stage pump clock input connected to the first lead of the first active capacitor;

a voltage clamp coupled to the particular node which provides a bias point; and a dynamic biasing circuit connected to the common node which provides charge to the second lead of the first active capacitor and the first lead of the second active capacitor at the common node and the particular node between transitions of the stage pump clock to keep both the first and the second active capacitors activated during transitions of the stage pump clock;

wherein the first and second active capacitors comprise n-channel MOS devices, and the dynamic biasing circuit includes:

a precharge circuit responsive to a stage charge clock to pull up the common node during intervals in which the stage pump clock is low.

14. The charge pump apparatus of claim 13, wherein the stage charge clock has transitions which are non-overlapping with transitions of the stage pump clock.

15. A charge pump apparatus including a plurality of pump stages, at least one of the plurality stages comprising:

a first active capacitor activated by a threshold voltage having a first lead and a second lead;

a second active capacitor activated by a threshold voltage, and connected in series with the first active capacitor, having a first lead connected to a common node with the second lead of the first active capacitor and a second lead, the second lead connected to a particular node;

a stage pump clock input connected to the first lead of the first active capacitor;

a voltage clamp coupled to the particular node which provides a bias point; and a dynamic biasing circuit connected to the common node which provides charge to the second lead of the first active capacitor and the first lead of the second active capacitor at the common node and the particular node between transitions of the stage pump clock to keep both the first and the second active capacitors activated during transitions of the stage pump clock;

wherein the first and second active capacitors comprise p-channel MOS devices, and the dynamic biasing circuit includes;

a precharge circuit responsive to a stage charge clock to pull down the common node during intervals in which stage pump clock is high.

16. The charge pump apparatus of claim 15, wherein the stage charge clock has transitions which are non-overlapping with transitions of the stage pump clock.

17. A charge pump apparatus, comprising:

a pump clock input which receives a pump clock;

a charge clock input which receives a charge clock having transitions which are non-overlapping with transitions of the pump clock;

a first n-channel MOS device having source and drain terminals coupled to the pump clock input and having a gate coupled to a common node;

a second n-channel MOS device having source and drain terminals coupled to the common node and having a gate;

a voltage clamp coupled to the gate of the second n-channel MOS capacitor which prevents the gate of the second n-channel device from falling below a bias point; and a precharge circuit, connected to the common node and the charge clock input, responsive to the charge clock to pull up the common node between transitions of the pump clock and while the pump clock is in a low state.

18. The charge pump apparatus of claim 17, wherein the precharge circuit initializes the common node to a low voltage, and ensures that the second n-channel MOS device first activates before a low to high transition of the pump clock.

19. A charge pump apparatus, comprising:

a pump clock input which receives a pump clock;

a charge clock input which receives a charge clock having transitions which are non-overlapping with transitions of the pump clock;

a first p-channel MOS device having source and drain terminals coupled to the pump clock input and having a gate coupled to a common node;

a second p-channel MOS device having source and drain terminals coupled to the common node and having a gate;

a voltage clamp coupled to the gate of the second p-channel MOS capacitor which prevents the gate of the second p-channel device from rising above a bias point; and a precharge circuit, connected to the common node and the charge clock input, responsive to the charge clock to pull down the common node between transitions of the pump clock and while the pump clock is in a high state.

20. The charge pump apparatus of claim 19, wherein the precharge circuit initializes the common node to a high voltage, and ensures that the second p-channel MOS device first activates before a high to low transition of the pump clock.

* * * * *